(12) United States Patent
Newman et al.

(10) Patent No.: US 11,674,365 B1
(45) Date of Patent: Jun. 13, 2023

(54) BATTERY SHUTTLE FOR ELECTRIC WELL SERVICE RIGS

(71) Applicants: Frederic M Newman, Midland, TX (US); James F Newman, Benbrook, TX (US); Steven P Newman, Midland, TX (US)

(72) Inventors: Frederic M Newman, Midland, TX (US); James F Newman, Benbrook, TX (US); Steven P Newman, Midland, TX (US)

( * ) Notice: Subject to any disclaimer, the term of this patent is extended or adjusted under 35 U.S.C. 154(b) by 0 days.

(21) Appl. No.: 18/109,766

(22) Filed: Feb. 14, 2023

(51) Int. Cl.
*E21B 41/00* (2006.01)
*E21B 43/12* (2006.01)
*E21B 7/02* (2006.01)

(52) U.S. Cl.
CPC ............ *E21B 41/0085* (2013.01); *E21B 7/02* (2013.01); *E21B 43/128* (2013.01)

(58) Field of Classification Search
CPC ....... E21B 41/0085; E21B 7/02; E21B 43/128
See application file for complete search history.

(56) References Cited

U.S. PATENT DOCUMENTS

| | | | |
|---|---|---|---|
| 6,276,449 B1 | 8/2001 | Newman | |
| 6,377,189 B1 | 4/2002 | Newman | |
| 7,717,193 B2 | 5/2010 | Egilsson et al. | |
| 11,339,612 B1 | 5/2022 | Newman | |
| 11,401,797 B1 | 8/2022 | Newman | |
| 11,448,014 B1 | 9/2022 | Newman | |
| 11,448,050 B1 | 9/2022 | Newman | |
| 11,572,260 B1 | 2/2023 | Newman | |
| 2002/0153134 A1 | 10/2002 | Newman | |
| 2002/0156582 A1 | 10/2002 | Newman | |
| 2003/0196798 A1 | 10/2003 | Newman | |
| 2004/0065874 A1 | 4/2004 | Newman | |
| 2004/0162658 A1 | 8/2004 | Newman | |
| 2005/0103491 A1 | 5/2005 | Newman | |
| 2009/0057630 A1 | 3/2009 | Newman | |
| 2009/0063054 A1 | 3/2009 | Newman | |
| 2013/0276291 A1 | 10/2013 | Huseman | |
| 2016/0204719 A1 | 7/2016 | Lesanko | |
| 2017/0370358 A1 | 12/2017 | Graybill | |
| 2021/0025236 A1* | 1/2021 | Piraccini | ................... E21B 3/02 |

OTHER PUBLICATIONS

OE; NOV Energy Recovery System for Offshore Rigs Gets Corvus ESS; www.oedigital.com/news/483117-nov-energy-recovery-system-for-offshore-rigs-gets-corvus-ess; 4 pages; publication date: Nov. 11, 2020.
Texas Administrative Code, Title 16, Part 1, Ch. 3, Rule 3.37 (Year: 2021).

* cited by examiner

*Primary Examiner* — Steven A MacDonald
(74) *Attorney, Agent, or Firm* — bobharter.com; Robert J. Harter

(57) ABSTRACT

A battery shuttle method uses a portable battery shuttle for delivering backup power to an electric well service rig operating in a well field that includes multiple wells. The electric well service rig has a rechargeable rig power pack for powering the rig's electric hoist. The electric hoist is used for removing and installing a wellstring within a chosen well. The battery shuttle has a rechargeable shuttle power pack for recharging the rig power pack when needed. The battery shuttle can travel back and forth between the electric well service rig and a charging station. The charging station is used for recharging the shuttle power pack.

20 Claims, 13 Drawing Sheets

BATTERY SHUTTLE FOR ELECTRIC WELL SERVICE RIGS

FIELD OF THE DISCLOSURE

This patent generally pertains to mobile electric well service rigs for servicing wells at wellsites and more specifically to means for delivering portable electrical power to such rigs.

BACKGROUND

Oil and gas wells consist of several components that work together to extract fossil fuels from the Earth's crust. The wellhead is located at the surface and serves as the entry point for the well. It includes a casing head, which seals off the well and prevents any liquids or gases from escaping. The blowout preventer is a safety mechanism that can shut off the flow of oil and gas in the event of an emergency. The production tubing is a steel pipe that extends from the wellhead to the reservoir and allows oil and gas to flow to the surface. A valve system, known as a Christmas tree, is attached to the wellhead for controlling the flow of oil and gas. The reservoir, located deep underground, contains the trapped oil and gas that is brought to the surface through the well.

Sucker rods are a crucial component of some oil and gas wells, as they transfer the mechanical force to lift the oil and gas to the surface. Sucker rods are made of steel and connect a surface pumpjack to a downhole reciprocating pump. The pumpjack is a large, iconic, mechanical device that is used to lift oil and gas from the well. The pumpjack applies a reciprocating motion to the sucker rods, which drives the downhole pump to force the oil and gas to the surface.

As an alternative to a pumpjack, some wells have an Electrical Submersible Pump (ESP) system. This is a downhole pumping system that is generally used in high-volume wells. It is particularly useful in wells with high water cuts or low reservoir pressure. The ESP system is submersible and includes an electric motor driving a multistage centrifugal pump. The ESP system is more efficient and has a longer operational life compared to traditional pumpjack systems.

Service rigs are specialized vehicular equipment used for performing maintenance and repair work on oil and gas wells. They are designed to support various well intervention activities, including workover operations, completion work, and well stimulation. Service rigs play a critical role in ensuring the optimal performance and longevity of oil and gas wells.

During workover operations, service rigs have a large hoist for removing and replacing worn-out or damaged production equipment, such as tubing, sucker rods, pumps, and downhole valves. Service rigs also perform other critical maintenance tasks, such as cleaning out wellbores, testing production wells, and installing new downhole equipment. Service rigs can play a key role in well stimulation, which is the process of improving well performance by injecting chemicals and other materials into the well to enhance the flow of oil and gas.

In addition to maintenance work, service rigs can also be used for completion work, which involves installing the production equipment needed to bring a newly drilled well into production. This can include installing production casing, perforating the casing, and installing downhole equipment, such as safety valves, gas lift systems, and artificial lift systems.

DETAILED DESCRIPTION

Figure 1:
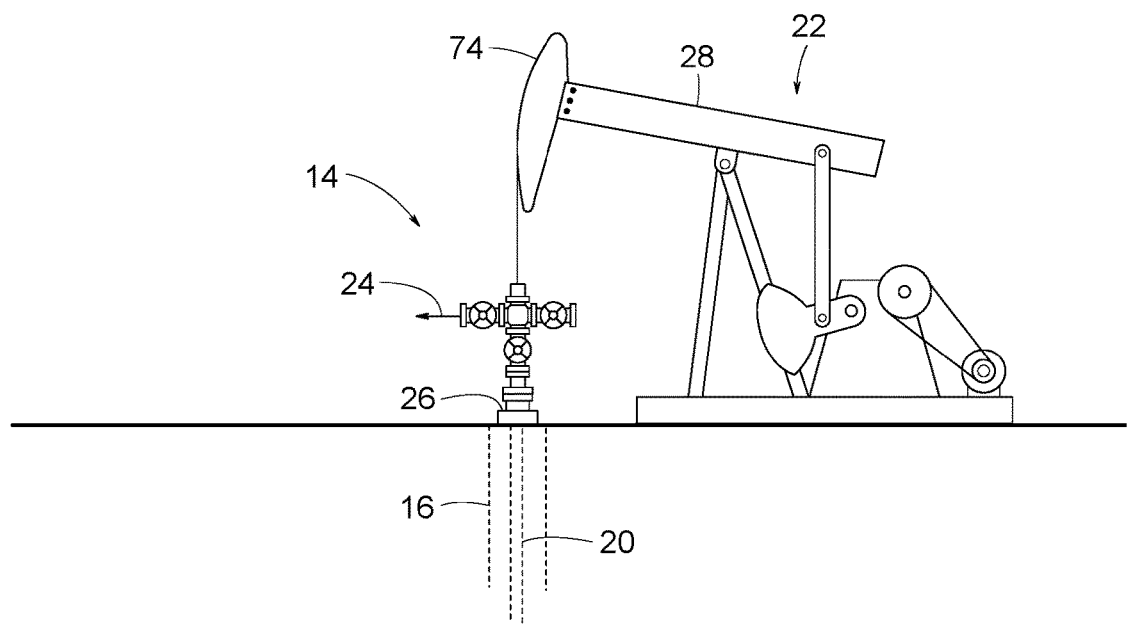
FIG. 1 is a schematic diagram of an example active well with example means for pumping fluid up from within the well.

FIGS. 1-15 illustrate a method of using an electric well service rig 10 and a battery shuttle 12 for servicing a plurality of wells 14 (e.g., wells 14a-d) in a well field 16. In some examples, the well field 16 is an area of land that includes more than one well 14 within a hundred acres. In other examples, the well field 16 is an area of land that includes more than one well 14 distributed over more than a hundred acres.

Each well 14 includes a wellbore 16 with a casing 18, a string of tubing 20a, and pumping means 22 for pumping a fluid 24 (e.g., oil, gas, etc.) up from within the ground. Pumping means 22 pumps the fluid 24 up through the string of tubing 20a and out through a known wellhead 26. One known example of pumping means 22 includes a pumpjack 28 coupled to a string of sucker rods 20b to drive a submerged pump in reciprocating motion. An ESP (Electrical Submersible Pump) is another known example of pumping means 22. The string of tubing 20a and the string of sucker rods 20b are examples of a wellstring 20 that is suspended within the wellbore 16 during normal operation.

More information about pumping means 22 and wells 14 can be found in U.S. Pat. Nos. 11,339,612; 11,401,797; 11,448,014; 11,448,050; and 11,572,260; all of which are specifically incorporated herein by reference. These patents also describe some examples of the electric well service rig 10. The term, "electric well service rig" refers to any vehicular equipment with a hoist driven by an electric motor, wherein the hoist is meant for lifting or lowering a wellstring within a wellbore. The term, "servicing a well" as it relates to the electric well service rig 10 at a well 14 refers to the electric well service rig 10 lifting 30 or lowering 32 the wellstring 20 within the well 14, as shown in FIG. 3.

Figure 2:
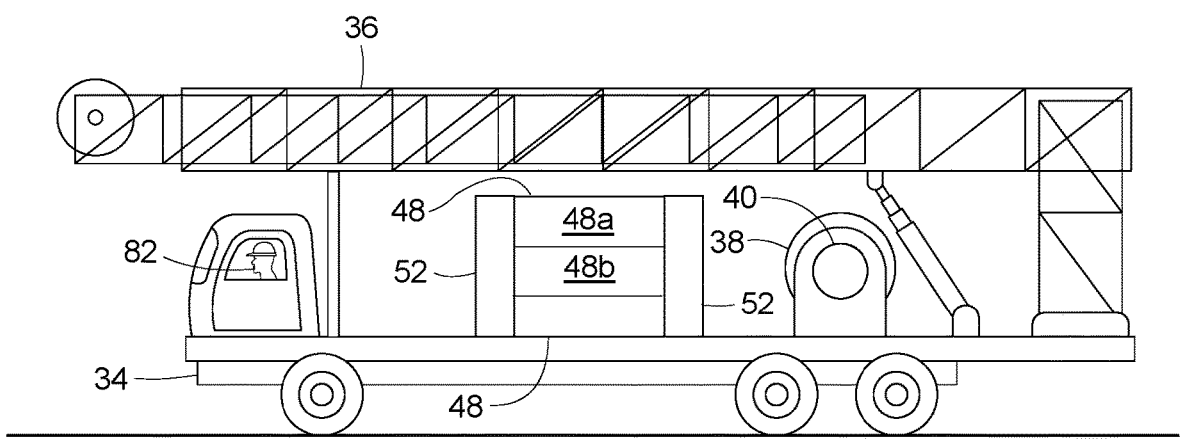
FIG. 2 is a schematic side view of an example electric well service rig in a travel configuration.
Figure 3:
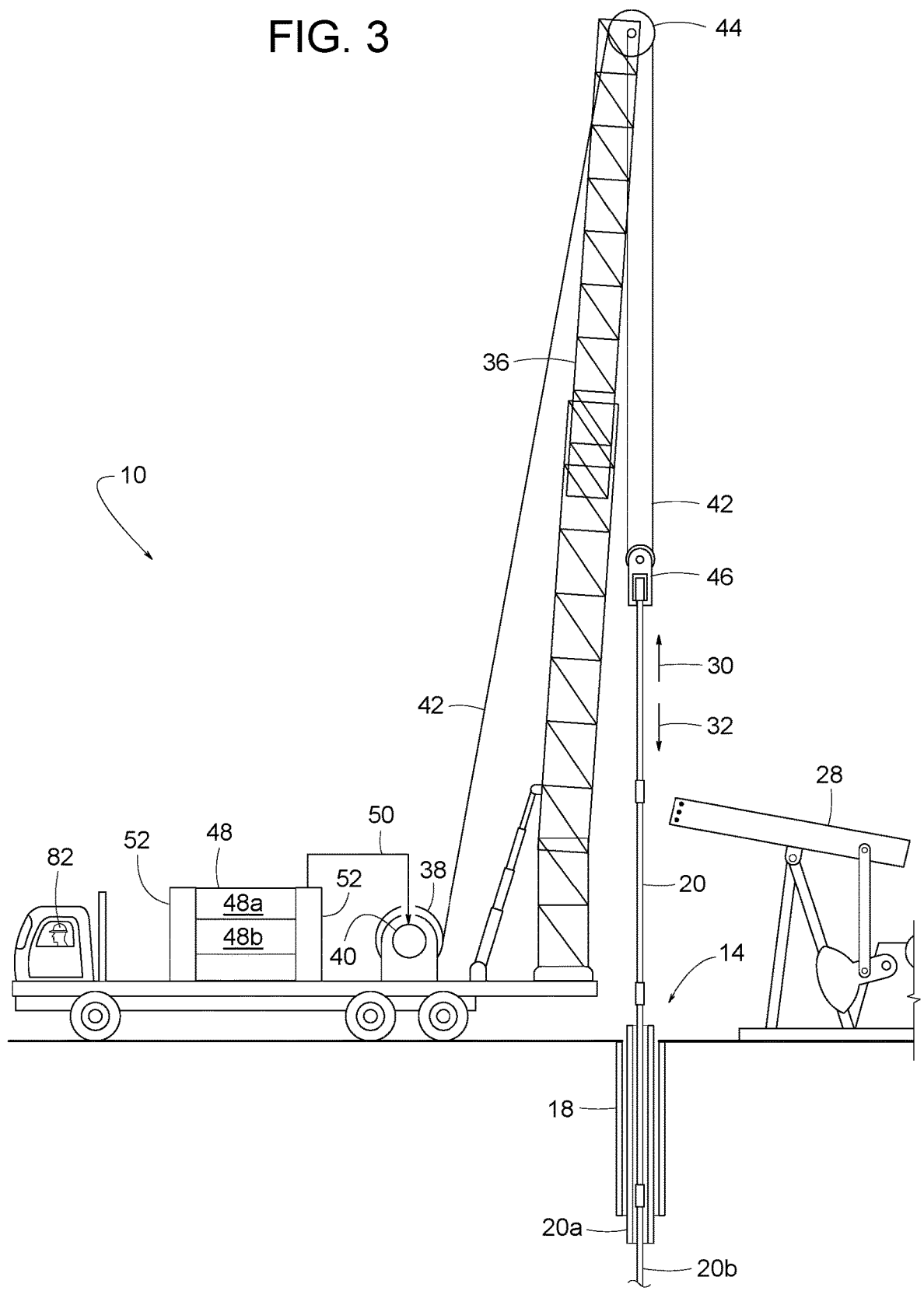
FIG. 3 is a schematic side view of the electric well service rig in a working configuration to lift a wellstring up from within a deactivated well.

In the example shown in FIGS. 2 and 3, the electric well service rig 10 comprises a vehicle 34 (e.g., truck, trailer, etc.) carrying an extendible mast 36, a hoist drum 38, an electric hoist motor 40, a cable 42, a crown block 44, a traveling block and elevator 46, and a rig power pack 48. To carry all the weight of such heavy equipment, some examples of well service rig 10 comprises a Class-8 vehicle with a GVWR (gross vehicle weight rating) of more than 33,000 lbs. FIG. 2 shows the electric well service rig 10 in a traveling configuration with the mast 36 retracted and generally horizontal. FIG. 3 shows the electric well service rig 10 in a working configuration with the mast 36 extended in a nearly vertical orientation.

In the working configuration, the cable 42 is wrapped around hoist drum 38, feeds over the crown block 44, and leads to the traveling block and elevator 46. The electric hoist motor 40 rotates the hoist drum 38 in forward or reverse to raise or lower the traveling block and elevator 46, and thus raise or lower a wellstring 20 (e.g., the string of tubing 20a or the string of sucker rods 20b).

In some examples, the electric hoist motor 40 receives electrical power (e.g., a first electrical current 50) from the rig power pack 48. The rig power pack 48 is schematically illustrated to represent any rechargeable electric power storage system for repeatedly storing and releasing electrical energy. Such systems are sometimes called an ESS or energy storage system. Some examples of the rig power pack 48 include a battery, one or more banks of batteries, a battery cluster, rechargeable batteries, lithium-ion batteries, lead-acid batteries, nickel-cadmium batteries, nickel manganese cobalt (NMC), lithium iron phosphate (LFP), nickel-metal hydride batteries, nickel-zinc batteries, flow battery (e.g., redox flow battery, iron-flow battery), lithium-ion polymer batteries, solid-state batteries, lithium metal polymer (LMP), supercapacitors, ultracapacitors, and various combinations thereof.

Some examples of rig power pack 48 include circuitry for controlling, regulating and/or limiting the rig power pack's incoming and/or outgoing flow of electrical energy. In some examples, such circuitry is part of a rig power pack controller 52. The rig power pack controller 52 is schematically illustrated to represent any electrical circuit for directing, selectively interrupting, and/or modifying the flow of electricity. Some examples of the rig power pack controller 52 include a computer, a microprocessor, a programmable logic controller (PLC), electromechanical relays, a battery management system (BMS), an inverter, a rectifier, a DC-to-DC converter, and various combinations thereof. In some examples, the rig power pack controller 52 is at a single location. In some examples, the rig power pack controller 52 is distributed over multiple locations. In some examples, the rig power pack controller 52 includes a computer readable medium having stored thereon, in a non-transitory state, an executable program code that, when executed, causes certain intended physical outcomes.

Some examples of the rig power pack 48 include at least a first battery bank 48a and a second battery bank 48b. The term, "battery bank" refers to a battery module comprising a set of interconnected batteries. Some examples of the rig power pack 48 include more than two battery banks. Some examples of the rig power pack 48 include three battery banks with each one having a storage capacity of 60 kWh to provide the rig power pack 48 with a total of 180 kWh of electrical storage.

In some examples, the rig power pack controller 52 controls the electrical current to and from the rig power pack 48 such that one of the battery banks 48a or 48b delivers the first electrical current 50 to power the electric hoist motor 40 while the other battery bank 48a or 48b is being recharged by an incoming second electrical current 54. In some examples, the rig power pack controller 52 directs the flow of current such that the roles of the battery banks 48a and 48b alternate between being recharged or powering the electric motor hoist 40.

Figure 4:
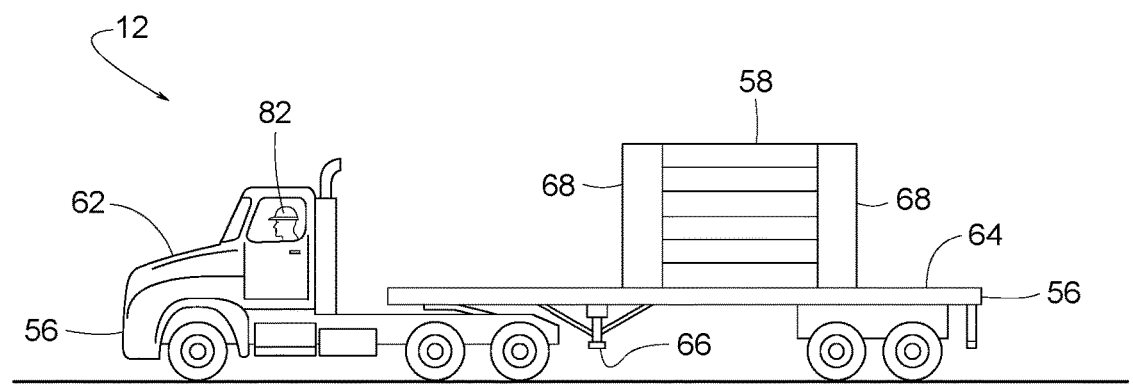
FIG. 4 is a schematic side view of an example battery shuttle in the form of a trailer hitched to a tractor.
Figure 5:
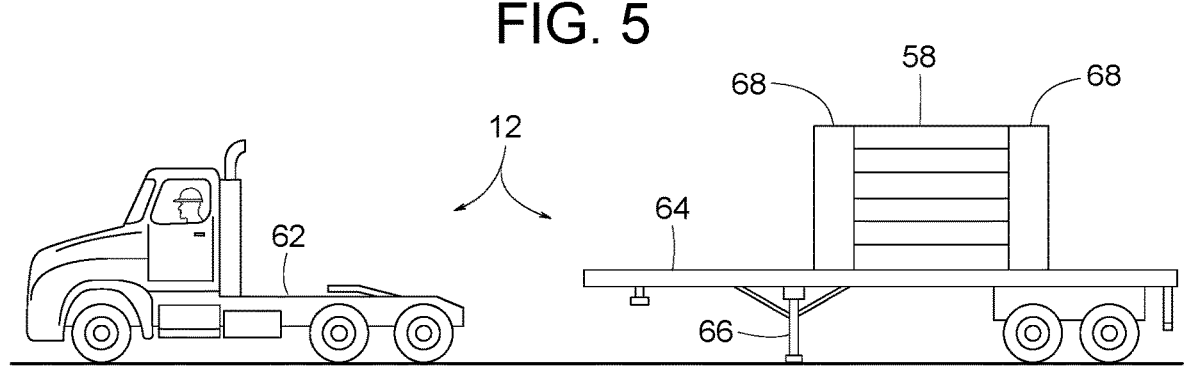
FIG. 5 is a schematic side view of the battery shuttle shown in FIG. 4 but showing the trailer detached from the tractor.

FIGS. 4 and 5 show an example of the battery shuttle 12 comprising a vehicle 56 (e.g., a truck, a trailer, a tractor, and various combinations thereof) carrying a shuttle power pack 58. If needed, the battery shuttle 12 can travel to a well 14 to recharge or augment the rig's power pack 48 while the electric well service rig 10 continues working at the well 14. Afterwards, the battery shuttle 12 can travel back to a charging station 60 to recharge its shuttle power pack 58. In some examples, the battery shuttle 12 comprises a trailer that can be hitched to and pulled behind the electric well service rig 10. In some examples, a forklift or other means unloads the shuttle power pack 58 from the vehicle 56 of the battery shuttle 12 and sets the shuttle power pack 58 where it can be used by the electric well service rig 10 at the well 14 (e.g., at well 14b).

In the illustrated example, the vehicle 56 of the battery shuttle 12 comprises a tractor 62 and a trailer 64. FIG. 4 shows the trailer 64 hitched to the tractor 62. FIG. 5 shows the trailer 64 unhitched and separated from the tractor 62. Some hitch style examples include a bumper hitch, a weight-distribution hitch, a pintle hitch, a gooseneck hitch, and a fifth-wheel hitch. Landing gear 66 can be lowered to help support the front end of the trailer 64 when the trailer 64 is detached from the tractor 62.

For simplicity and compactness, some examples of the battery shuttle 12 do not include a trailer hitch. Instead, some example battery shuttles 12 are a unitary truck, such as a pickup truck with a cabin for the driver and a bed for cargo. Some example battery shuttles 12 comprise a Class-5 vehicle with a GVWR of 16,001 to 19,000 lbs (e.g., a Ford F-550). Some example battery shuttles 12 comprise a Class-4 vehicle with a GVWR of 14,001 to 16,000 lbs (e.g., a Ford F-450).

The shuttle power pack 58 is schematically illustrated to represent any rechargeable electric power storage system (e.g., an ESS) for repeatedly storing and releasing electrical energy. Some examples of the shuttle power pack 58 include a battery, one or more banks of batteries, a battery cluster, rechargeable batteries, lithium-ion batteries, lead-acid batteries, nickel-cadmium batteries, nickel manganese cobalt (NMC), lithium iron phosphate (LFP), nickel-metal hydride batteries, nickel-zinc batteries, flow battery (e.g., redox flow battery, iron-flow battery), lithium-ion polymer batteries, solid-state batteries, lithium metal polymer (LMP), supercapacitors, ultracapacitors, and various combinations thereof.

Some examples of the shuttle power pack 58 include multiple battery banks. Some examples of the shuttle power pack 58 include six battery banks with each one having a storage capacity of 60 kWh to provide the shuttle power pack 58 with a total of 360 kWh of electrical storage. This provides sufficient energy for most service operations at a well 14.

It should be noted that although the battery shuttle 12 weighs less than the electric well service rig 10, the battery shuttle 12 carries more electrical energy storage as needed. So, while the electric well service rig 10 has the size and weight-carrying capacity to hold the necessary heavy equipment, the battery shuttle 12 is more compact and nimble to maneuver around the equipment.

Some examples of shuttle power pack 58 include circuitry for controlling, regulating and/or limiting the shuttle power pack's incoming and/or outgoing flow of electrical energy. In some examples, such circuitry is part of a shuttle power pack controller 68.

The shuttle power pack controller 68 is schematically illustrated to represent any electrical circuit for strategically directing, selectively interrupting, and/or modifying the flow of electricity. Some examples of the shuttle power pack controller 68 include a computer, a microprocessor, a programmable logic controller (PLC), electromechanical relays, a battery management system (BMS), an inverter, a rectifier, a DC-to-DC converter, and various combinations thereof.

In some examples, the shuttle power pack controller 68 is at a single location. In some examples, the shuttle power pack controller 68 is distributed over multiple locations. In some examples, the shuttle power pack controller 68 includes a computer readable medium having stored thereon, in a non-transitory state, an executable program code that, when executed, causes certain intended physical outcomes.

Figure 6:
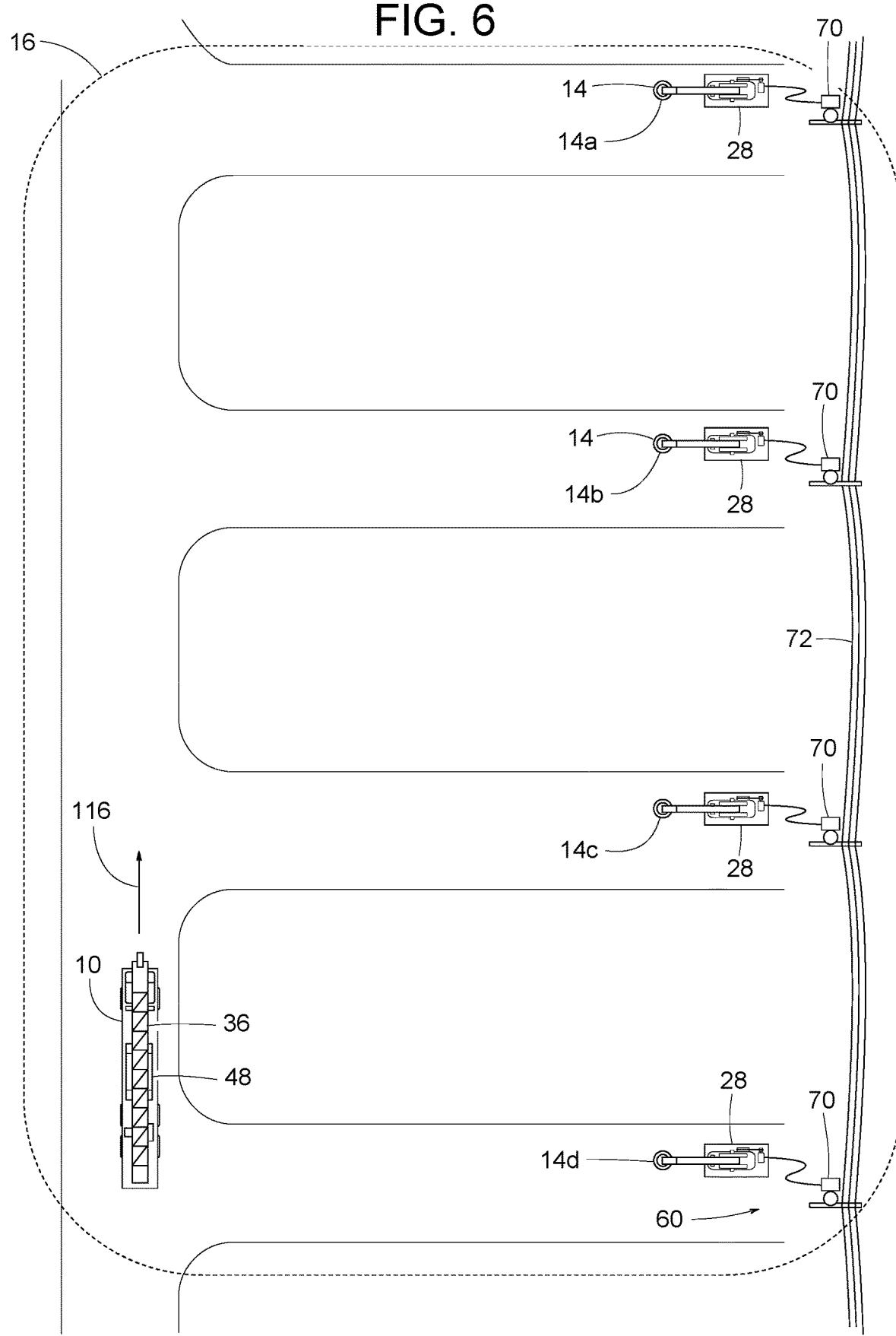
FIG. 6 is a schematic top view of an example well field with a plurality of wells that can be serviced by the example electric well service rig shown in FIGS. 2 and 3.

FIGS. 6-15 illustrate various example battery shuttle methods. FIG. 6 shows four pumpjacks 28 operating normally to draw a fluid 24 up from the corresponding four wells 14. Each of the pumpjacks 28 connects to an electrical box 70 (e.g., transformer, relays, contactors, terminals, etc.) to receive electrical power from an electrical power grid 72. The term, "electrical power grid" refers to a network of electrical transmission lines connecting multiple generating stations to a plurality of loads over an area spanning more than a mile. FIG. 6 also shows an electric service rig 10 traveling to one of the wells 14 to service, for example, the first well 14b.

Figure 7:
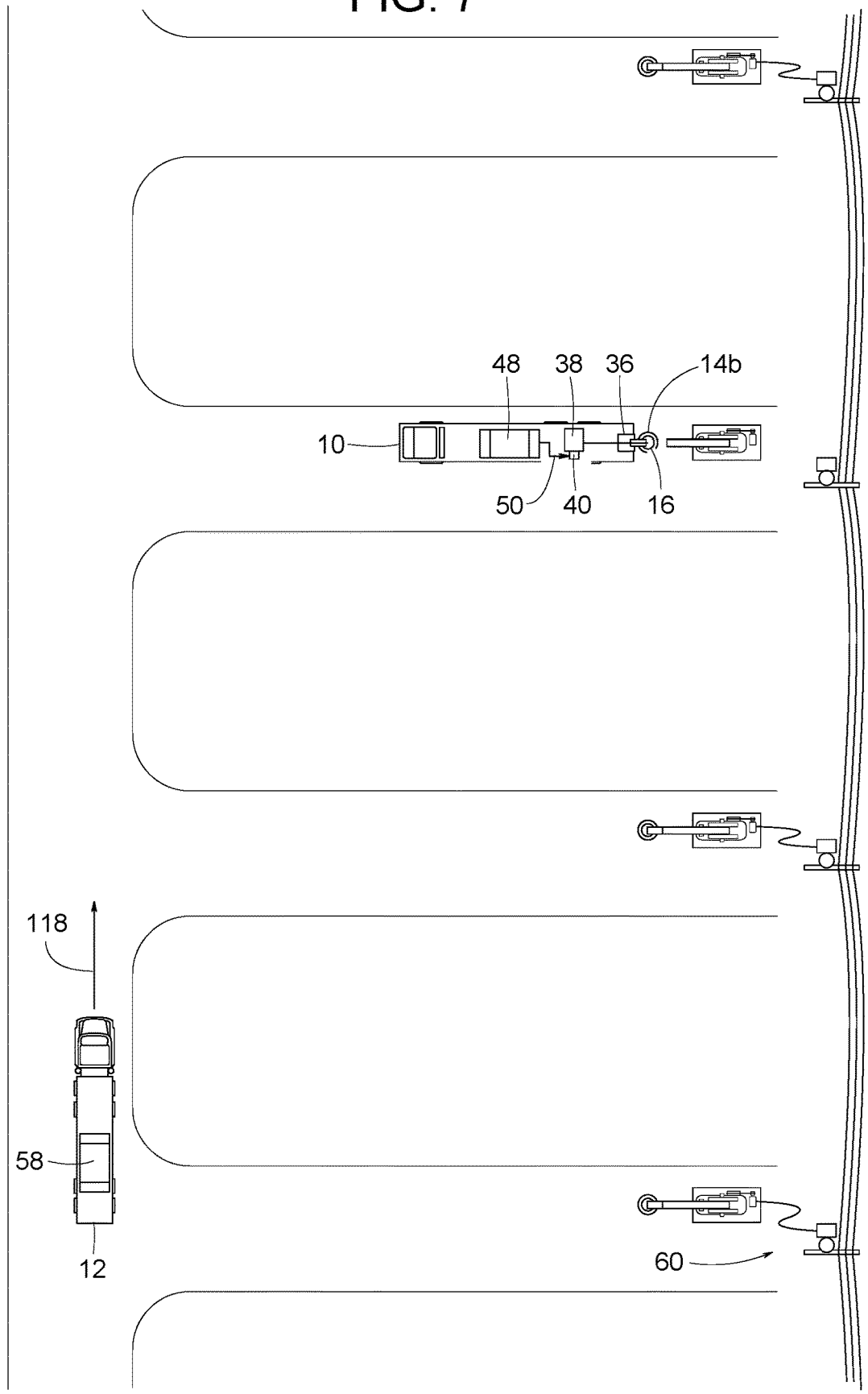
FIG. 7 is a schematic top view similar to FIG. 6 but showing one of the wells deactivated and serviced by the electric well service rig of FIGS. 2 and 3 with incoming assistance from the example battery shuttle of FIGS. 4 and 5.

FIG. 7 shows an example of servicing the first well 14b, which involves deactivating the well 14b by de-energizing its pumpjack 28, disassembling part of the wellhead 26, and removing the pumpjack's horse head 74. With the horse head 74 removed, the electric service rig 10 has access to the well 14b for removing or inserting wellstrings 20. To remove or insert wellstrings 20, the electric service rig 10 is parked at, for example, the well 14b with the rig's mast 36 extended over the wellbore 16, as shown in FIG. 7. To power the hoist, the rig power pack 48 delivers the first electrical current 50 to the electric hoist motor 40.

FIG. 7 also shows the battery shuttle 12 en route to the well 14b in case the electric service rig 10 needs additional electrical power. In some examples, however, the electric well service rig 10 has sufficient energy stored on its rig power pack 48 to complete the service work on the well 14b without the need for additional energy from the battery shuttle 12. In such examples, after completion of the work at the well 14b, the rig's power pack 48 can be recharged directly at the charging station 60.

Figure 8:
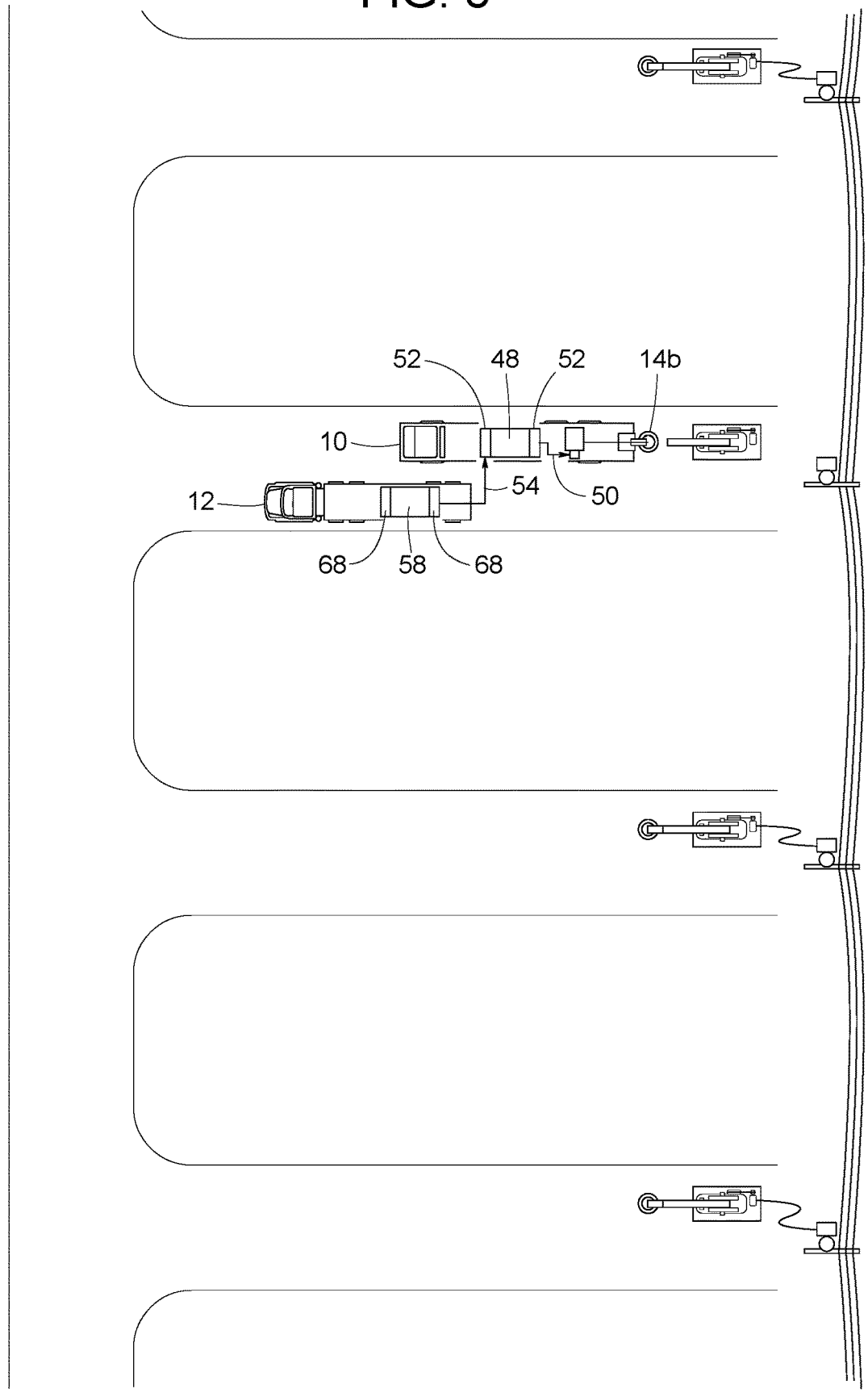
FIG. 8 is a schematic top view similar to FIG. 7 but showing the battery shuttle delivering electrical power to the electric well service rig at the deactivated well.

In examples where electric well service rig 10 needs additional power, FIG. 8 shows the battery shuttle 12 parked by the electric well service rig 10. In this example, the shuttle power pack 58 delivers the second electrical current 54 to the rig power pack 48, while the first electrical current 50 continues flowing from the rig power pack 48 to the electric hoist motor 40. The second electrical current 54 helps replenish the rig power pack's charge as the first electrical current 50 flows from the rig power pack 48 to the electric hoist motor 40.

In some examples, the rig power pack 48 has a rated operating voltage, and the shuttle power pack 58 has an output voltage. The rated operating voltage of the rig power pack 48 is the voltage that drives the first electrical current 50 from the rig power pack 48 to the load (e.g., to the electric hoist motor 40). The output voltage of the shuttle power pack 58 is the voltage that drives the second electrical current 54 from the shuttle power pack 58 to the rig power pack 48. In some examples, the output voltage is greater than the rated operating voltage to drive the second electrical current 54 from the shuttle power pack 58 to the rig power pack 48.

In some examples, the shuttle power pack 58 has a greater energy storage capacity than the rig power pack 48. Providing the rig power pack 48 with less energy storage capacity means that the rig power pack 48 can be smaller and lighter than the shuttle power pack 58. With the rig power pack 48 being lighter, the electric well service rig 10 can carry other heavy equipment (e.g., hoist drum 38, cable 42, electric hoist motor 40, mast 36, etc.) without exceeding a maximum allowable weight limit for over-the-road traveling.

Figure 9:
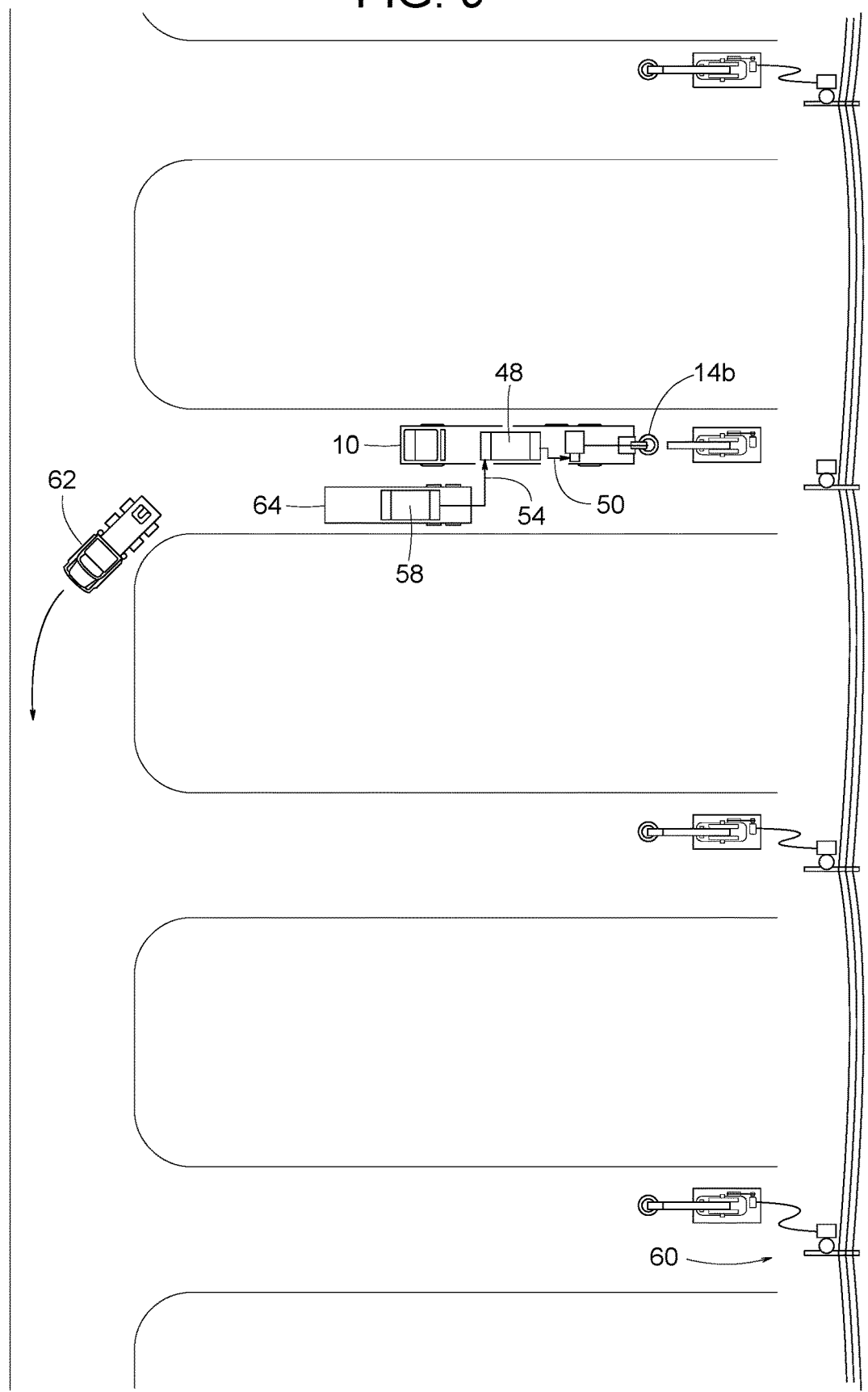
FIG. 9 is a schematic top view similar to FIG. 8 but showing the battery shuttle's tractor disengaged from the battery shuttle's trailer.

FIG. 9 shows the trailer 64 disengaged from the tractor 62. This allows the tractor 62 to leave the area and do other things, while the shuttle power pack 58 can continue feeding the second electrical current 54 to the rig power pack 48.

Figure 10:
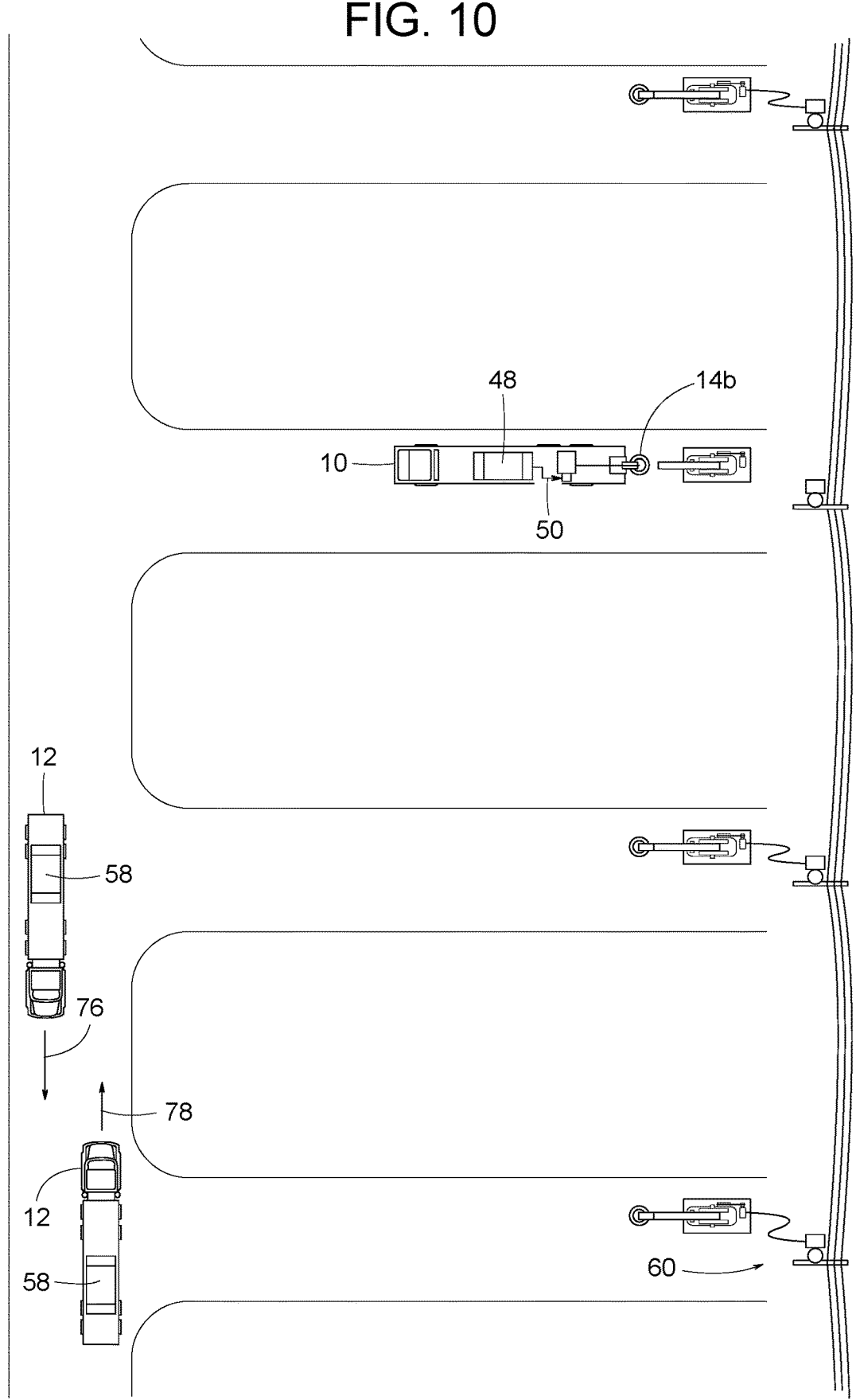
FIG. 10 is a schematic top view similar to FIG. 7 but showing battery shuttles traveling to and from the deactivated well.

FIG. 10 shows examples of battery shuttles 12 traveling to and from the well 14b while the well 14b is being serviced by the electric well service rig 10. Arrow 76 of FIG. 10 represents the battery shuttle 12 traveling away from the first well 14b during a first period when the electric well service rig 10 is lifting the wellstring 20 at the first well 14b. Arrow 78 of FIG. 10 represents the battery shuttle 12 traveling to the first well 14b during a second period when the electric well service rig 10 is lifting the wellstring 20 at the first well 14b. Shuttle power packs 58 can be shuttled to and from the first well 14b while the electric well service rig 10 continues working.

Figure 11:
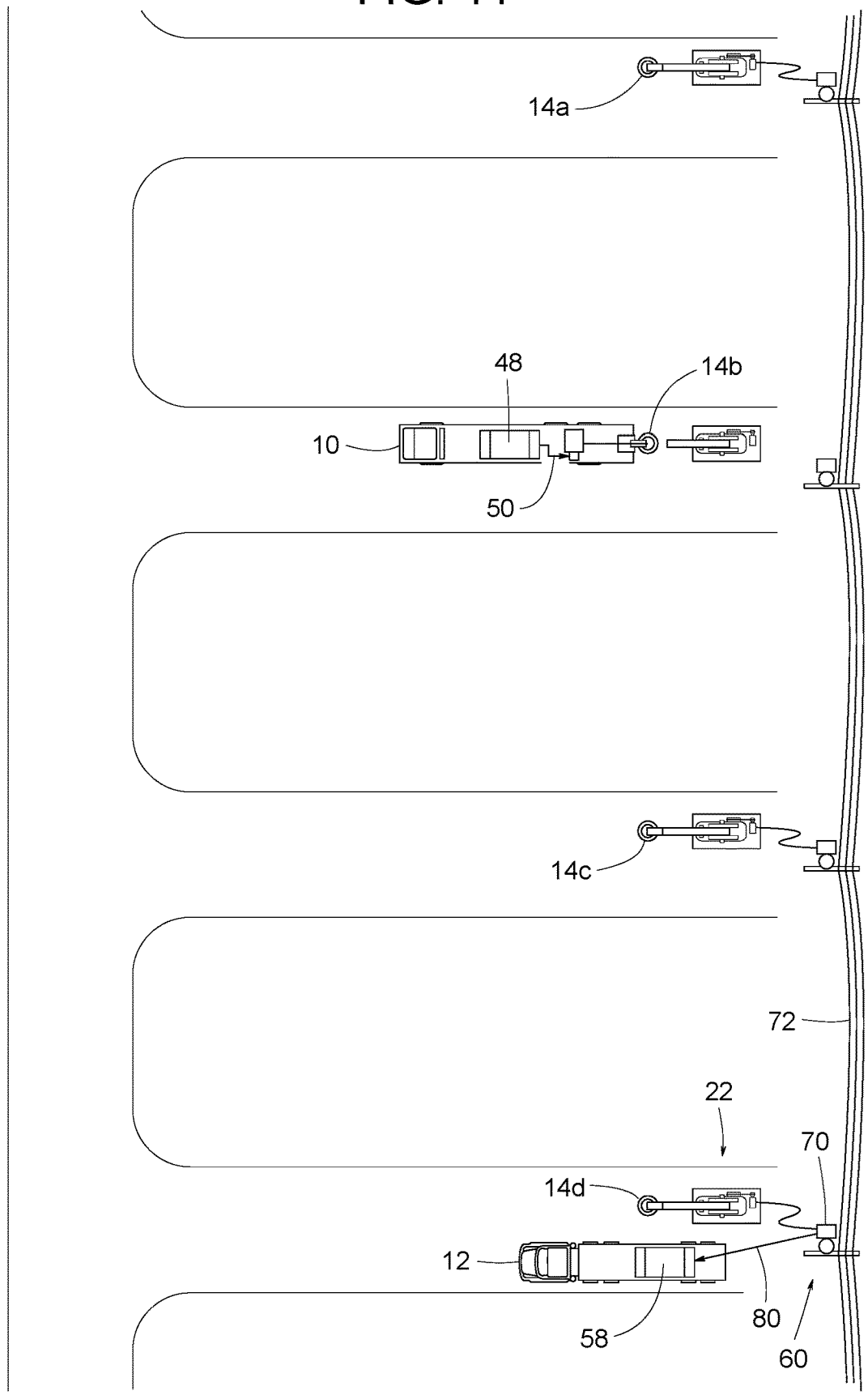
FIG. 11 is a schematic top view similar to FIG. 7 but showing the battery shuttle being recharged at a charging station.

FIG. 11 shows the electric well service rig 10 servicing the first well 14b while the shuttle power pack 58 is being recharged at the charging station 60. In some examples, the charging station 60 is at an other well 14d of the plurality of wells 14 because well 14d happens to have an electrical connection 70 (an electrical enclosure, a transformer, electrical terminals, etc.) for conveniently tapping into the electrical power grid 72, as at least some of the electrical connection 70 is already associated with the pumping means 22 for the well 14d. Consequently, in some examples, the charging station 60 is closer to the other well 14d than to the first well 14b. In some examples, some conventional wiring might need to be added to make the electrical connection 70 (normally used for the pumping means 22) suitable for use as the charging station 60. In other examples, the charging station 60 is wired to the electrical power grid 72 independent of any electrical connection 70 associated with the well's pumping means 22. In some examples, the charging station 60 is within the well field 16. In some examples, the charging station 60 is beyond the well field 16. In some examples, the charging station 60 is not directly associated with any of the wells 14. In some examples, the charging station 60 is inside or next to a building, such as a maintenance facility, garage, warehouse, etc.

The term, "charging station" refers to any place where the shuttle power pack 58 can be recharged by a third electrical current 80. In some examples, the third electrical current 80 comes from the electrical connection 70 that can connect the shuttle power pack 58 to the electrical power grid 72. In some examples, the electrical power grid 72 is what also powers the pumping means 22 (pumpjack, ESP, etc.) of the plurality of wells 14 at the well field 16 during normal well pumping operation.

Figure 12:
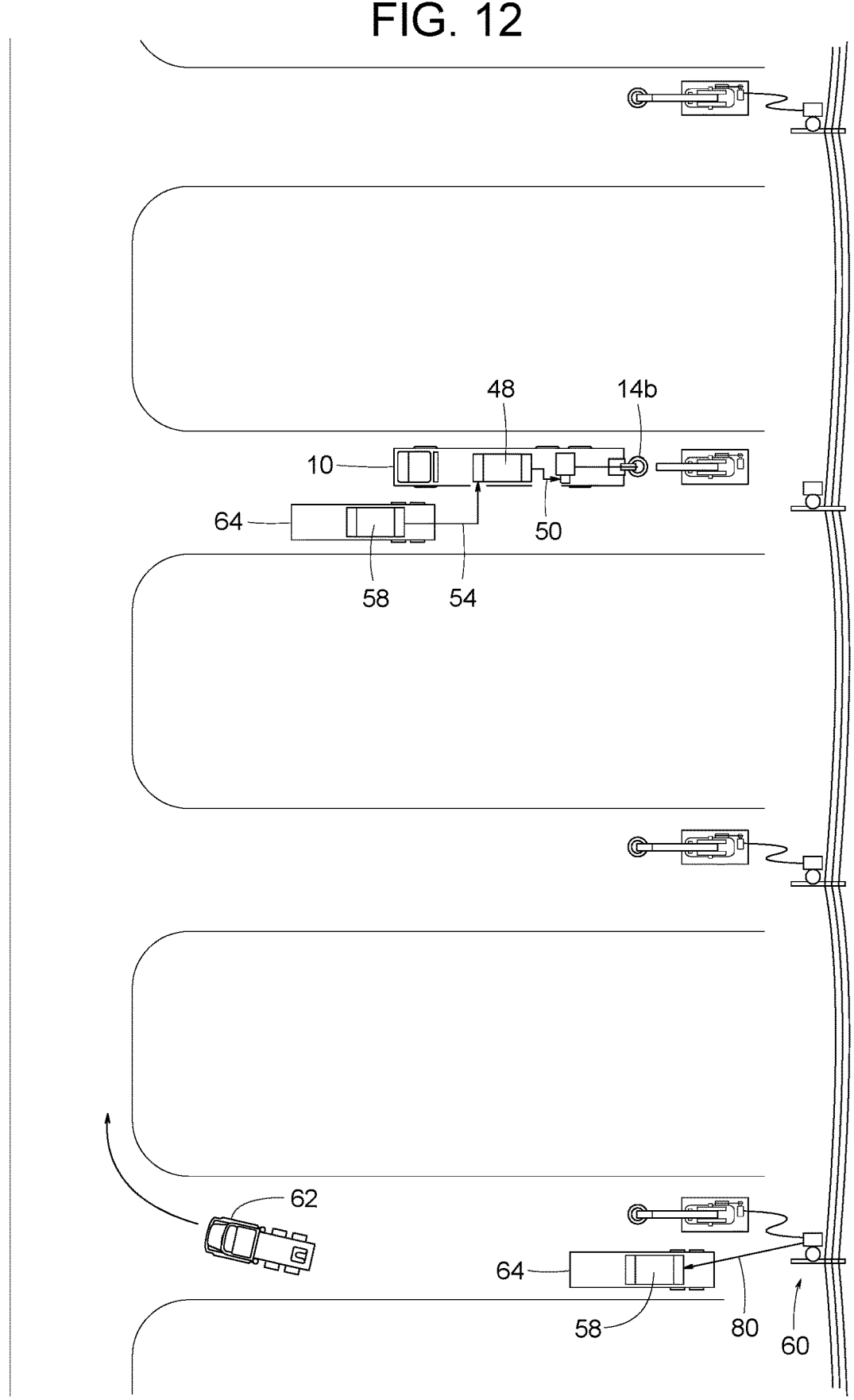
FIG. 12 is a schematic top view similar to FIG. 7 but showing a tractor shuttling trailers with shuttle power packs between the deactivated well and the charging station.

FIG. 12 shows a single tractor 62 shuttling two trailers 64 with shuttle power packs 58 between the charging station 60 and the first well 14*b* while the electric well service rig 10 continues servicing the first well 14*b*. In the illustrated example, one shuttle power pack 58 delivers the second electrical current 54 to the electric well service rig 10 at the first well 14*b* while the charging station 60 delivers the third electrical current 80 to recharge the other shuttle power pack 58.

Figure 13:
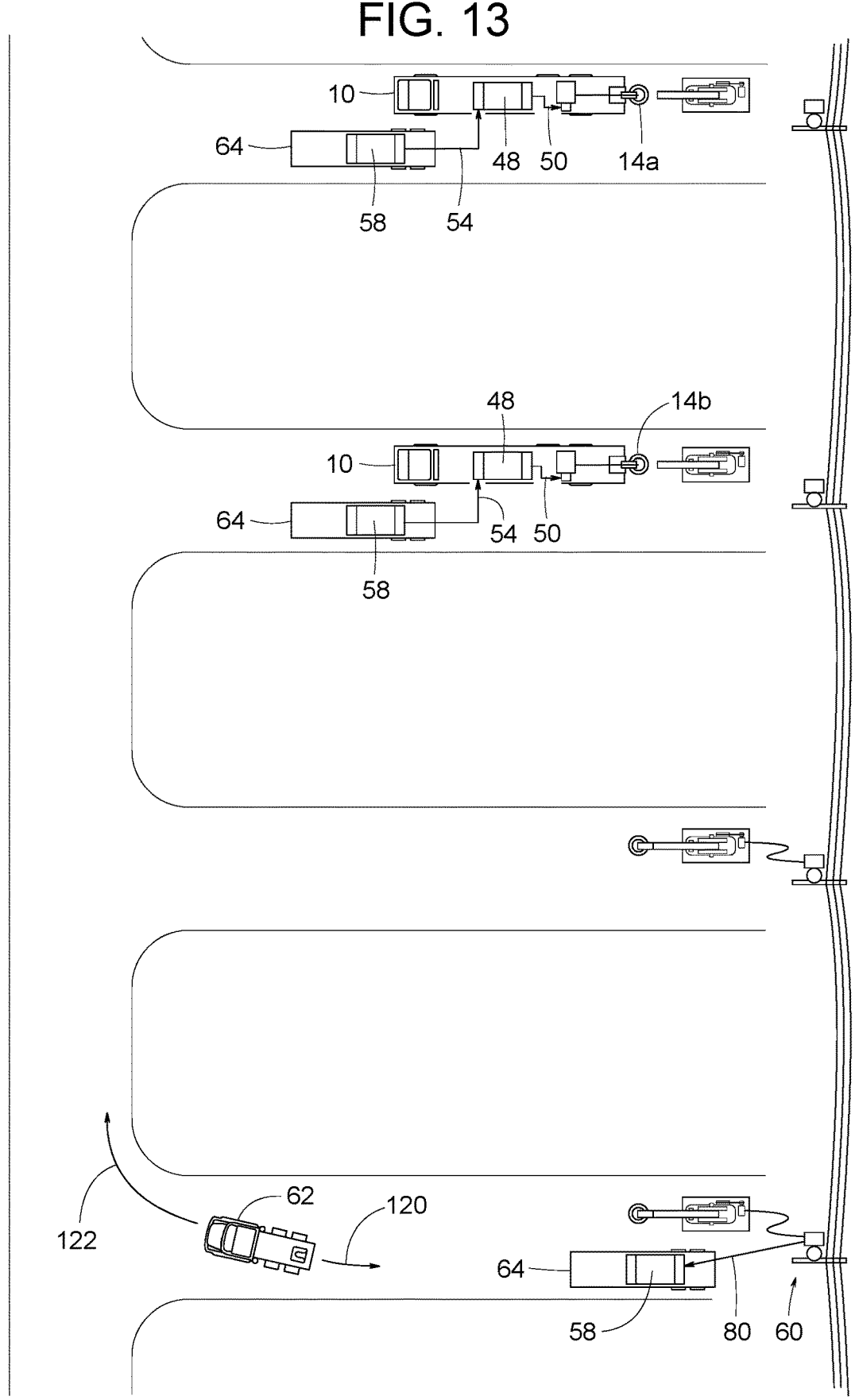
FIG. 13 is a schematic top view similar to FIG. 12 but showing tractor shuttling multiple trailers with shuttle power packs between the charging station and multiple deactivated wells.

FIG. 13 shows a single tractor 62 shuttling three trailers 64 with shuttle power packs 58 between the charging station 60 and a multiplicity of wells 14' (e.g., the first well 14*b* and a second well 14*a*) of the plurality of wells 14. In some examples, the multiplicity of wells 14' is a subset of the plurality of wells 14. While one shuttle power pack 58 is being recharged at the charging station 60, two other shuttle power packs 58 recharge the rig power packs 48 at wells 14*a* and 14*b* as these two wells 14*a* and 14*b* are being serviced by a corresponding two electric well service rigs 10.

Figure 14:
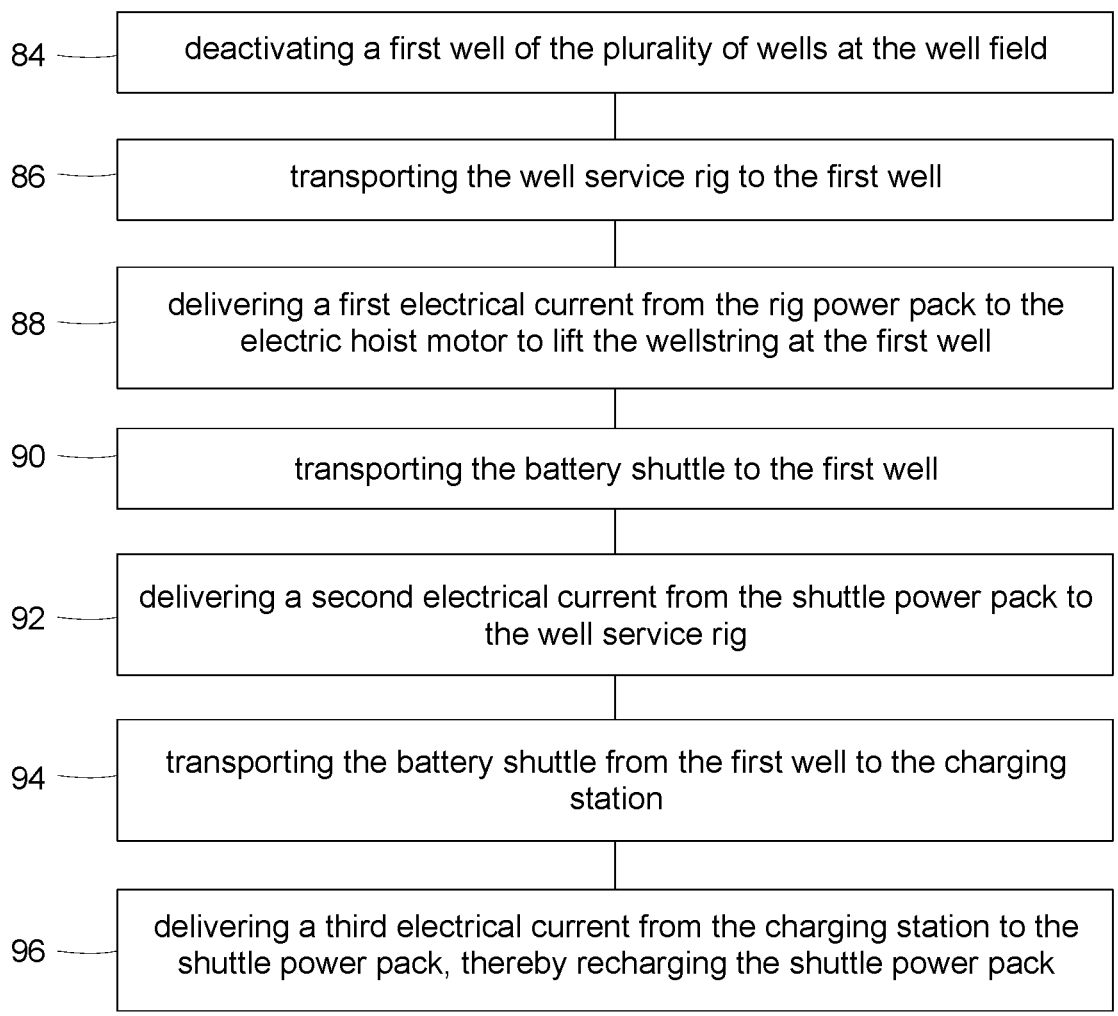
FIG. 14 is a flow diagram illustrating various battery shuttle methods.
Figure 15:
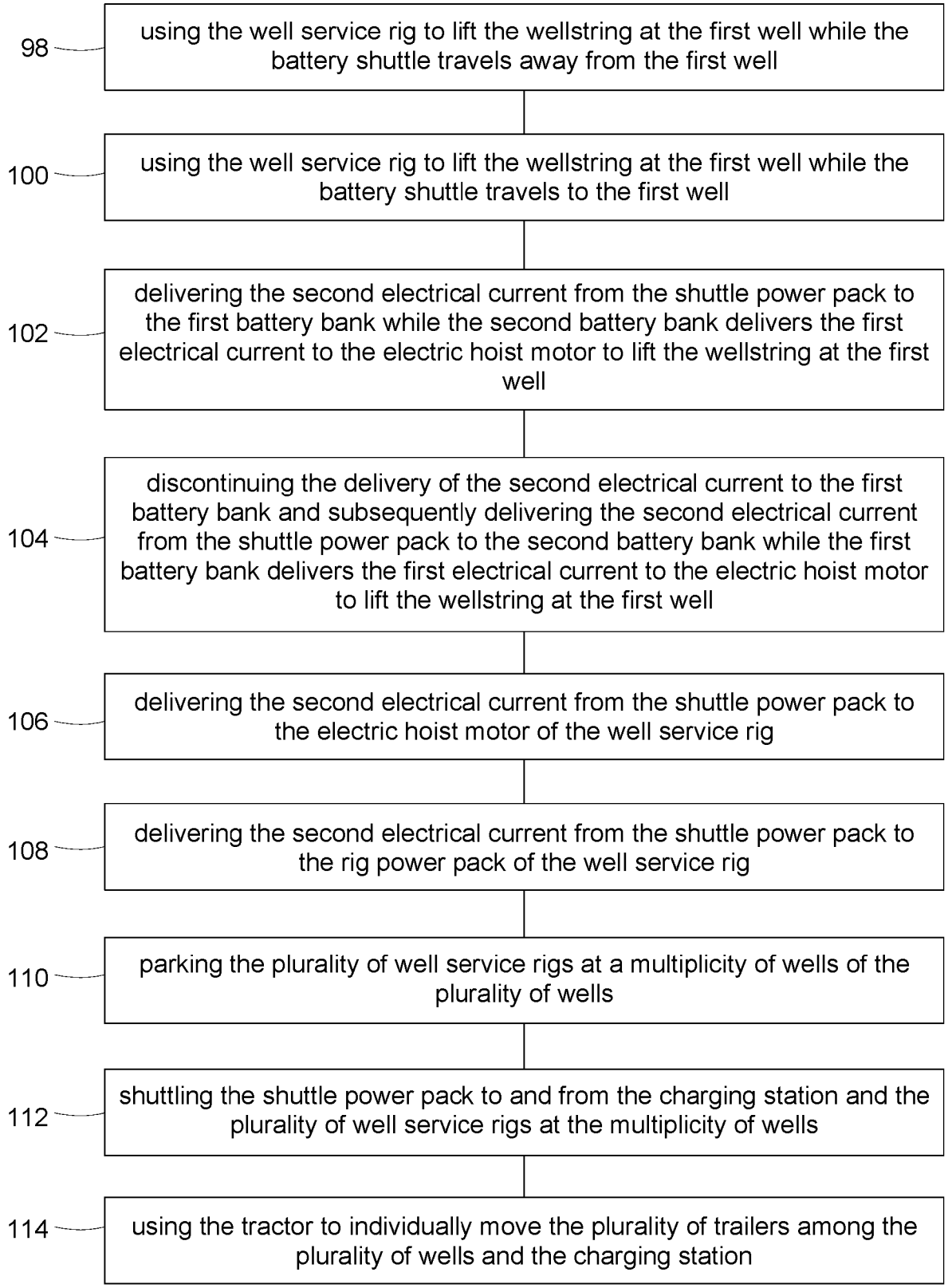
FIG. 15 is a flow diagram illustrating various battery shuttle methods.

FIGS. 14 and 15 illustrate various battery shuttle method steps. In some examples, some of the steps are optional and can be omitted. In some examples, the steps can be performed in a different sequence. In some examples, the method steps can be performed by one or more battery shuttles 12, one or more electric well service rigs 10, charging station 60, and/or a human worker 82; wherein the human worker 82 is associated with the battery shuttle 12, the electric well service rig 10, the well field 16, the electric power grid 72, and/or the charging station 60.

In FIG. 14, a block 84 represents deactivating the first well 14*b* of the plurality of wells 14 at the well field 16. A block 86 of FIG. 14 and an arrow 116 of FIG. 6 represents transporting the well service rig 10 to the first well 14*b*. A block 88 of FIG. 14 and arrow 50 of FIGS. 3 and 7 represents delivering a first electrical current 50 from the rig power pack 48 to the electric hoist motor 40 to lift (arrow 30 of FIG. 3) the wellstring 20 at the first well 14*b*. A block 90 of FIG. 14 and an arrow 118 of FIG. 7 represents transporting the battery shuttle 12 to the first well 14*b*. A block 92 of FIG. 14 and the arrow 54 of FIG. 8 represents delivering the second electrical current 54 from the shuttle power pack 58 to the well service rig 10. A block 94 of FIG. 14 and the arrow 76 of FIG. 10 represents transporting the battery shuttle 12 from the first well 14*b* to the charging station 60. A block 96 of FIG. 14 and an arrow 80 of FIG. 11 represents delivering the third electrical current 80 from the charging station 60 to the shuttle power pack 58, thereby recharging the shuttle power pack 58.

A block 98 of FIG. 15, the arrow 30 of FIG. 3, and the arrow 76 of FIG. 10 together represent using the well service rig 10 to lift the wellstring 20 at the first well 14*b* while the battery shuttle 12 travels away from the first well 14*b*. A block 100 of FIG. 15, the arrow 30 of FIG. 3, and the arrow 78 of FIG. 10 together represent using the well service rig 10 to lift the wellstring 20 at the first well 14*b* while the battery shuttle 12 travels to the first well 14*b*. A block 102 of FIG. 15 represents delivering the second electrical current 54 from the shuttle power pack 58 to the first battery bank 48*a* while the second battery bank 48*b* delivers the first electrical current 50 to the electric hoist motor 40 to lift the wellstring 20 at the first well 14*b*. A block 104 of FIG. 15 represents discontinuing the delivery of the second electrical current 54 to the first battery bank 48*a* and subsequently delivering the second electrical current 54 from the shuttle power pack 58 to the second battery bank 48*b* while the first battery bank 48*a* delivers the first electrical current 50 to the electric hoist motor 40 to lift the wellstring 20 at the first well 14*b*. A block 106 of FIG. 15 represents delivering the second electrical current 54 from the shuttle power pack 58 to the electric hoist motor 40 of the well service rig 10. A block 108 of FIG. 15 represents delivering the second electrical current 54 from the shuttle power pack 58 to the rig power pack 48 of the well service rig 10. FIG. 13 and a block 110 of FIG. 15 represent parking the plurality of well service rigs 10 at a multiplicity of wells 14' of the plurality of wells 14. A block 112 of FIG. 15 and arrows 120 and 122 of FIG. 13 represent shuttling the shuttle power pack 58 to and from the charging station 60 and the plurality of well service rigs 10 at the multiplicity of wells 14'. A block 114 of FIG. 15 and the arrows 120 and 122 of FIG. 13 represent using the tractor 62 to individually move the plurality of trailers 64 among the plurality of wells 14 and the charging station 60.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A battery shuttle method involving an electric well service rig, a plurality of wells at a well field, a battery shuttle, and a charging station; each well of the plurality of wells includes a wellstring suspended within a wellbore, the battery shuttle includes a shuttle power pack, the electric well service rig includes a rig power pack and an electric hoist motor, the battery shuttle method comprising:
    deactivating a first well of the plurality of wells at the well field;
    transporting the electric well service rig to the first well;
    delivering a first electrical current from the rig power pack to the electric hoist motor to lift the wellstring at the first well;
    transporting the battery shuttle to the first well;
    delivering a second electrical current from the shuttle power pack to the electric well service rig;
    transporting the battery shuttle from the first well to the charging station; and
    delivering a third electrical current from the charging station to the shuttle power pack, thereby recharging the shuttle power pack.

2. The battery shuttle method of claim 1, wherein the charging station is closer to an other well of the plurality of wells than to the first well.

3. The battery shuttle method of claim 1, further comprising:

using the electric well service rig to lift the wellstring at the first well while the battery shuttle travels away from the first well.

4. The battery shuttle method of claim 1, further comprising:
using the electric well service rig to lift the wellstring at the first well while the battery shuttle travels to the first well.

5. The battery shuttle method of claim 1, wherein the rig power pack includes a first battery bank and a second battery bank, and the battery shuttle method further comprising:
delivering the second electrical current from the shuttle power pack to the first battery bank while the second battery bank delivers the first electrical current to the electric hoist motor to lift the wellstring at the first well.

6. The battery shuttle method of claim 5, further comprising discontinuing the delivery of the second electrical current to the first battery bank and subsequently delivering the second electrical current from the shuttle power pack to the second battery bank while the first battery bank delivers the first electrical current to the electric hoist motor to lift the wellstring at the first well.

7. The battery shuttle method of claim 1 further comprising delivering the second electrical current from the shuttle power pack to the electric hoist motor of the electric well service rig.

8. The battery shuttle method of claim 1 further comprising delivering the second electrical current from the shuttle power pack to the rig power pack of the electric well service rig.

9. The battery shuttle method of claim 1, wherein the shuttle power pack has an output voltage greater than a rated operating voltage of the rig power pack.

10. The battery shuttle method of claim 1, wherein the shuttle power pack has a greater energy storage capacity than the rig power pack, yet the battery shuttle weighs less than the electric well service rig.

11. The battery shuttle method of claim 1, wherein the electric well service rig is one of a plurality of electric well service rigs, and the battery shuttle method further comprising:
parking the plurality of electric well service rigs at a multiplicity of wells of the plurality of wells; and
shuttling the shuttle power pack to and from the charging station and the plurality of electric well service rigs at the multiplicity of wells.

12. The battery shuttle method of claim 1, wherein the battery shuttle comprises a trailer upon which the shuttle power pack is attached.

13. The battery shuttle method of claim 1, wherein the battery shuttle method involves the use of a tractor, the battery shuttle is one of a plurality of battery shuttles, each battery shuttle of the plurality of battery shuttles comprises a trailer, thus there are a plurality of trailers corresponding in number to the plurality of battery shuttles, and the battery shuttle method further comprising:
using the tractor to individually move the plurality of trailers among the plurality of wells and the charging station.

14. A battery shuttle method involving an electric well service rig, a plurality of wells at a well field, a battery shuttle, and a charging station; each well of the plurality of wells includes a wellstring suspended within a wellbore, the battery shuttle includes a shuttle power pack, the electric well service rig includes a rig power pack and an electric hoist motor, the battery shuttle method comprising:
deactivating a first well of the plurality of wells at the well field;
transporting the electric well service rig to the first well;
delivering a first electrical current from the rig power pack to the electric hoist motor to lift the wellstring at the first well;
transporting the battery shuttle to the first well;
delivering a second electrical current from the shuttle power pack to the electric well service rig;
transporting the battery shuttle from the first well to the charging station, wherein the charging station is closer to a second well of the plurality of wells than to the first well;
delivering a third electrical current from the charging station to the shuttle power pack, thereby recharging the shuttle power pack;
using the electric well service rig to lift the wellstring at the first well during a first period when the battery shuttle is traveling away from the first well; and
using the electric well service rig to lift the wellstring at the first well during a second period when the battery shuttle is traveling to the first well.

15. The battery shuttle method of claim 14, wherein the rig power pack includes a first battery bank and a second battery bank, and the battery shuttle method further comprising:
delivering the second electrical current from the shuttle power pack to the first battery bank while the second battery bank delivers the first electrical current to the electric hoist motor to lift the wellstring at the first well.

16. The battery shuttle method of claim 15, further comprising discontinuing the delivery of the second electrical current to the first battery bank and subsequently delivering the second electrical current from the shuttle power pack to the second battery bank while the first battery bank delivers the first electrical current to the electric hoist motor to lift the wellstring at the first well.

17. The battery shuttle method of claim 14 further comprising delivering the second electrical current from the shuttle power pack to the electric hoist motor of the electric well service rig.

18. The battery shuttle method of claim 14 further comprising delivering the second electrical current from the shuttle power pack to the rig power pack of the electric well service rig.

19. The battery shuttle method of claim 14, wherein the shuttle power pack has an output voltage greater than a rated operating voltage of the rig power pack.

20. A battery shuttle method involving an electric well service rig, a plurality of wells at a well field, a battery shuttle, a charging station and a tractor; each well of the plurality of wells includes a wellstring suspended within a wellbore, the electric well service rig is one of a plurality of electric well service rigs each of which includes a rig power pack and an electric hoist motor, the battery shuttle is one of a plurality of battery shuttles, each battery shuttle of the plurality of battery shuttles comprises a trailer upon which a shuttle power pack is attached, thus there are a plurality of trailers and a plurality of shuttle power packs corresponding in number to the plurality of battery shuttles, the battery shuttle method comprising:
parking the plurality of electric well service rigs at a multiplicity of wells of the plurality of wells;
using the tractor to individually move the plurality of trailers among the multiplicity of wells and the charging station;

deactivating a first well of the plurality of wells at the well field;
transporting the electric well service rig to the first well;
delivering a first electrical current from the rig power pack to the electric hoist motor to lift the wellstring at the first well;
transporting the battery shuttle to the first well;
delivering a second electrical current from the shuttle power pack to the electric well service rig;
transporting the battery shuttle from the first well to the charging station, wherein the charging station is closer to an other well of the plurality of wells than to the first well;
delivering a third electrical current from the charging station to the shuttle power pack, thereby recharging the shuttle power pack;
using the electric well service rig to lift the wellstring at the first well during a first period when the battery shuttle is traveling away from the first well; and
using the electric well service rig to lift the wellstring at the first well during a second period when the battery shuttle is traveling to the first well.

* * * * *